June 20, 1933.     R. HOPKINSON     1,915,093
GEAR CHANGING MECHANISM
Filed March 28, 1933     4 Sheets-Sheet 1

INVENTOR
Russell Hopkinson

June 20, 1933.   R. HOPKINSON   1,915,093
GEAR CHANGING MECHANISM
Filed March 28, 1933   4 Sheets-Sheet 4

INVENTOR
Russell Hopkinson

Patented June 20, 1933

1,915,093

UNITED STATES PATENT OFFICE

RUSSELL HOPKINSON, OF NEW YORK, N. Y.

GEAR CHANGING MECHANISM

Application filed March 28, 1933. Serial No. 663,125.

This invention relates to an improved mechanical gear ratio changing mechanism and has as one of its principal objects to provide a mechanism, actuated by the clutch mechanism subsequent to the opening of the clutch or disengagement of motive power, capable of operatively connecting or engaging any of the sets of forward gears irrespective of which set was previously in operation, and a means of selecting which set shall be so engaged, which means is controlled by the vehicle speed at the moment just prior to re-engagement of motive power.

A further object of this invention is to provide a mechanism which will cause the gear selecting means to assume as many different operative positions as there are forward speeds, resting at no intermediate positions, and to move rapidly from a lower to the next higher position at a predetermined car speed and to return to the lower position preferably not at the same predetermined car speed but at some slightly lower speed.

A further object of this invention is to provide a mechanism capable of use in connection with the present day conventional form of gear box.

It has long been realized that by reducing the number of movements and thought processes involved in the operation of motor vehicles greater safety is attained. The universal installation of the automatic spark advance in place of manual control, and the use of automatic engine temperature regulators, synchro-mesh transmissions in connection with which my invention is particularly useful, and automatic clutches are all results of attempts to simplify the operations involved in the control of motor vehicles.

The most annoying detail still remains in the manual gear shift. It has been proposed heretofore to make automatic gear shifting mechanisms but the devices have either been inoperative or have been so cumbersome and delicate as to preclude their general use. Some have relied on the power derived solely from centrifugal governors to do the actual shifting of gears. Here an unduly large amount of power has been constantly drained from the engine and the governors must be very large. Some in trying to overcome this difficulty have relied on power supplied by the drive shaft or engine. Here the mechanism has been unduly complicated and costly.

A further drawback to mechanisms heretofore proposed has been the inability of the device to engage any but the next consecutive higher or lower gear to that then in operation. It has been impossible for example to make the transition from low to high without engaging all intermediate gears.

Still a further drawback to previous devices has been failure of the governor to provide several rapid and definite movements of the gear selecting means at appropriate predetermined car speeds. Usually the motions produced by the governor have been gradual and have been arrested by stops or locks to avoid premature changing of gears which stops or locks had to be removed by the operator to accomplish the gear change.

Although most speed controlled mechanisms for automatic selecting of gears provide a lock to prevent the shifting operation while the clutch is engaged, none apparently have utilized the motion of the clutch to effect the actual gear change.

My device takes advantage of the clutch motion in opening, whether produced pedally by the operator or by an automatic device, to cause the disengagement of any set of gears then in use, and takes advantage of its return motion just before closing or engaging, which is usually caused by the clutch spring, to engage a set of gears suitable to the speed of the vehicle at that moment.

In its preferred and simplest form my invention utilizes a continuation of the force exerted by the operator or automatic device in opening the clutch to disengage any engaged set of gears, and utilizes the energy thus stored in the clutch spring as it is released just prior to closing the clutch, to engage a set of gears appropriate to the vehicle's speed at that moment.

For a more complete understanding of the nature and objects of the invention reference is made to the detailed description and drawings, in which latter.

For simplicity in illustration, I have taken the usual three forward speed transmission familiar to all operators of passenger vehicles. In these the gears are usually engaged and disengaged by sliding two bars mounted above the gears and just beneath the familiar shift lever. Other devices are also used but to simplify the description of my apparatus I will assume the bar shift type of mechanism and the universal shift, the operation of which is well-known in the art. It will be sufficient for the purpose of describing my apparatus to say that the ordinary gear shift consists of a gear shift hand lever mounted on a swivel or ball joint a few inches from its lower end and extending upward convenient to the vehicle operator. The lower end is designed to engage one only of the gear shift bars at a time. Which bar is engaged depends on whether the lever is moved to the right or left when in neutral position: if to the right, the left bar is engaged; if to the left, the right bar. Moving the lever forward or back will then move the engaged bar backwards or forwards respectively, each extreme position engages gears or toothed members which produce various gear ratios between the engine and wheels which ratios are commonly referred to as "gears" or "speeds". In the case of the right bar these positions will be "reverse" and "low" respectively; in the case of the left bar "second" and "high" respectively. The engaged bar must be returned to the neutral position before the other bar may be engaged and moved.

Figure 1:
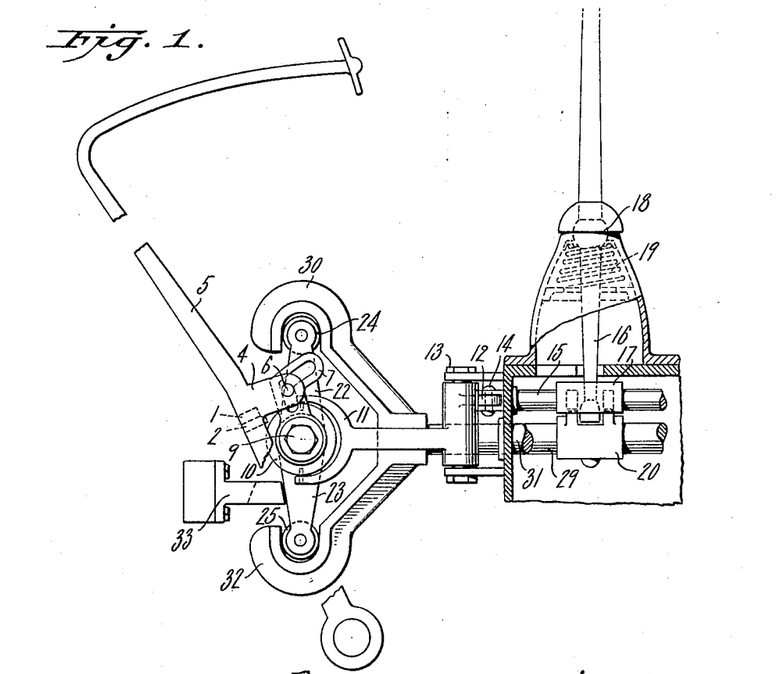
Figure 1 is a side elevation of one form of my invention with parts broken away.
Figure 2:
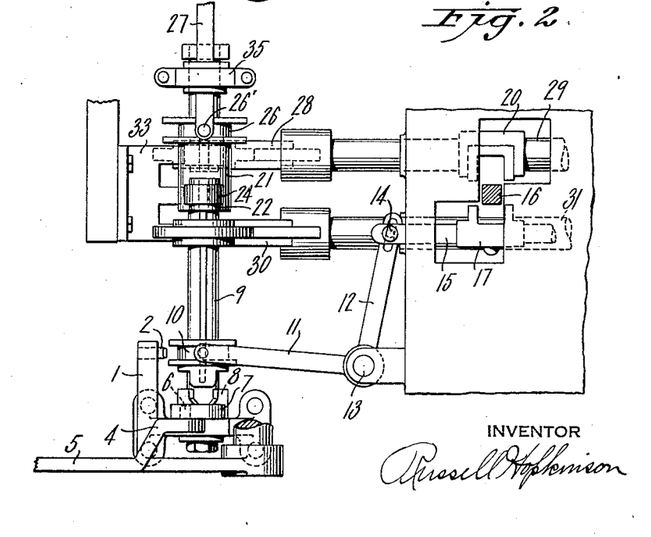
Figure 2 is a plan with parts broken away.

The following is a description of one form in which the principles of my inventions may be put into effect. A lug 4, Figures 1, 2, 4, integral with the clutch pedal 5 has attached thereto a pin 6 which permanently engages the angular slotted member 7 made integral with toothed sleeve 8. The latter rotates freely on shaft 9 and immediately facing it and splined to the same shaft is a second sleeve 10 suitably toothed to engage sleeve 8 and grooved to receive the pins of yoke 11 forming one arm of a crank pivotally mounted on the gear house at 13. The other arm 12 of the crank projects sideways and is suitably slotted to receive pin 14 fixed to the forward projecting end of sliding bar 15 mounted in the gear housing directly above the left gear shift bar 31. Fixed to bar 15 and suitably slotted and disposed to be engaged by the lower end of the hand lever 16 is sleeve 17. Hand lever 16 is mounted on an upward extension of the gear housing by a ball and socket joint 18 located directly above a point midway between the two gear shift bars 29 and 31, and normally held in the neutral (upright) position as shown in Figures 1 and 2 by spring 19. Thus it will be seen that if the top of the hand lever 16 is moved to the right and backwards the lower end will engage sleeve 17 and move bar 15 forward thus rotating 11—12 around 13 and causing sleeve 10 to engage sleeve 8. When so engaged release of the clutch pedal will cause not only sleeve 8 but shaft 9 to rotate clockwise. Due to the pin connection between lug 4 on clutch pedal 5 and slotted member 7 on sleeve 8 it will be seen that at least during a portion of the movement of the clutch pedal in either direction this movement positively rotates sleeve 8, and prevention of the rotation of 8 consequently prevents further movement of the clutch pedal.

Clutch pedal 5 also has attached to it a second lug 1 parallel to shaft 9 carrying downwardly extending lug 2 which when the clutch pedal is released engages between or behind the flanges of sleeve 10 and in this position prevents the latter from sliding on shaft 9 either to engage if disengaged from, or disengage if engaged with sleeve 8.

Mounted on the right hand gear shift bar 29 opposite sleeve 17 and suitably slotted and disposed to be engaged by the lower end of hand lever 16 is sleeve 20. Thus if the upper part of the hand lever is moved to the left and forward it will be seen that the lower end will engage sleeve 20 and move the right gear shift bar backwards which as already explained will engage "reverse".

Figure 3:
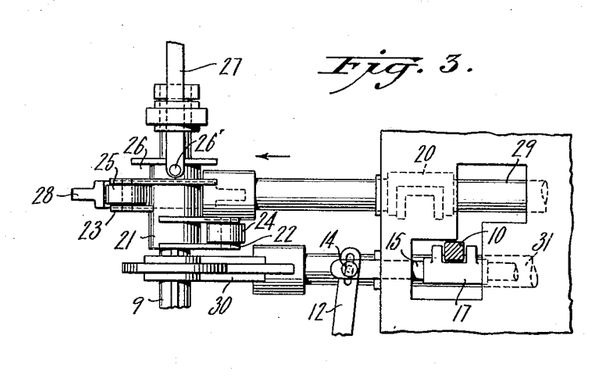
Figure 3 is a broken away plan showing positions of parts in first gear.
Figure 4:
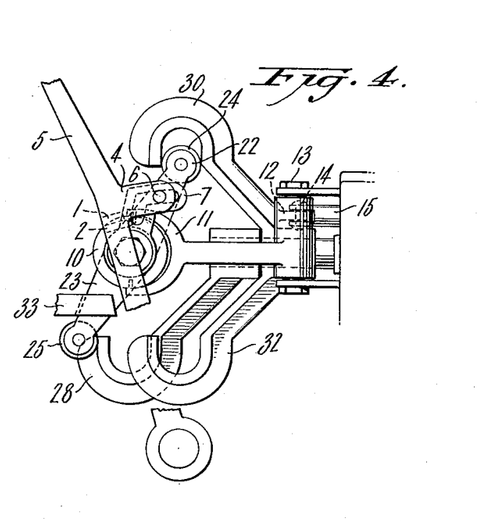
Figure 4 is a broken side view showing parts in second gear.
Figure 5:
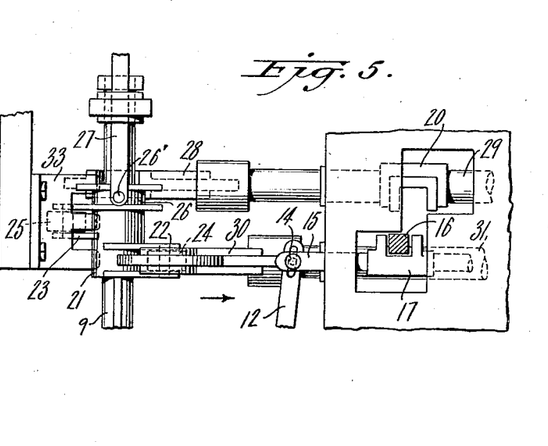
Figure 5 is a plan view corresponding to Figure 4.
Figure 6:
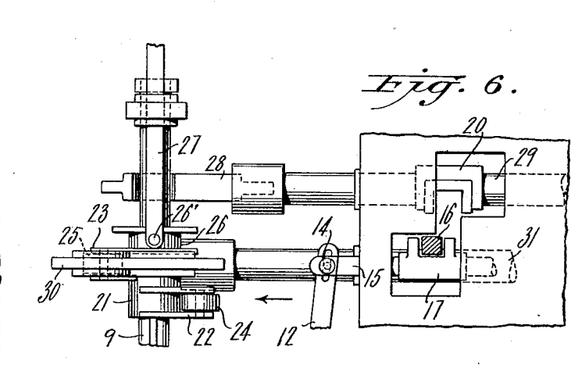
Figure 6 is a similar plan view showing the parts in high gear.
Figure 7:
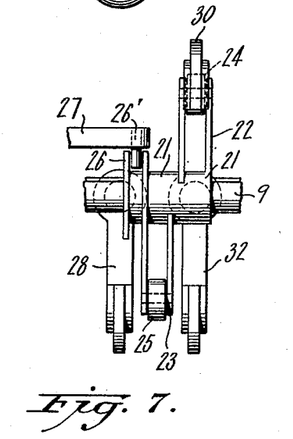
Figure 7 is a broken front elevation of the cam levers in the second position.

Also splined on shaft 9 and free to slide laterally thereon to assume three positions corresponding to first, second and high gear is sleeve 21 having two vertically and oppositely extending lever arms 22 and 23 carrying cam rollers 24 and 25 respectively. These two arms are not in the same vertical plane perpendicular to shaft 9 but are offset or staggered laterally as shown in Figure 7. Sleeve 21 is also provided with a flanged groove 26 in which groove engages a pin 26′ fixed to rod 27 which is moved laterally in a manner to be later described, and thus causes 21 to slide along shaft 9 to assume the three positions above referred to. In the first of these positions cam roller 25 engages the downwardly extending hooked member 28 fixed to the forward end of the right gear shift bar 29, and if when in this position shaft 9 is caused to rotate clockwise by releasing the clutch pedal the parts 28 and 29 will be moved forward thus engaging low gear as shown in Figure 3. By depressing the clutch pedal 5 the shaft 9 is rotated counter clockwise and 28 and 29 will be moved back again to the neutral position, Figure 1. In the second lateral position of sleeve 21 cam roller 24 engages the upwardly extending portion 30 of the double hook-shaped member attached to the forward end of the left gear shift bar 31, and if when in this position shaft 9 is caused to rotate clockwise by releasing the clutch pedal the parts 30 and 31 will be pushed backward thus engaging second gear as shown in Figures 4 and 5. If the clutch pedal is again depressed, as shaft 9 rotates back again the parts 30 and 31 will be moved forward to the neutral position, Figure 1. In the third lateral position of sleeve 21 cam roller 25 engages the downwardly extending portion 32 of the double hooked member attached to the forward end of the left gear shift bar 31, and if when in this position shaft 9 is caused to rotate as before by releasing the clutch pedal, the parts 32 and 31 will be moved forward thus engaging high gear as shown in Figure 6. In the neutral position, Figures 1 and 2, the hooked members 28, 30 and 32 are in lateral alignment, and only in this position is sleeve 21, carrying arms 22 and 23 terminating in cam rollers 24 and 25, free to slide laterally along shaft 9, due to piece 33 suitably fixed to the clutch housing, composed of alternate lugs and slots which engage arm 23 in each of the above positions as soon as the latter is rotated the slightest degree out of its neutral (upright) position.

Rod 27, and thus sleeve 21, is caused to slide along shaft 9 by the following mechanism.

Figure 8:
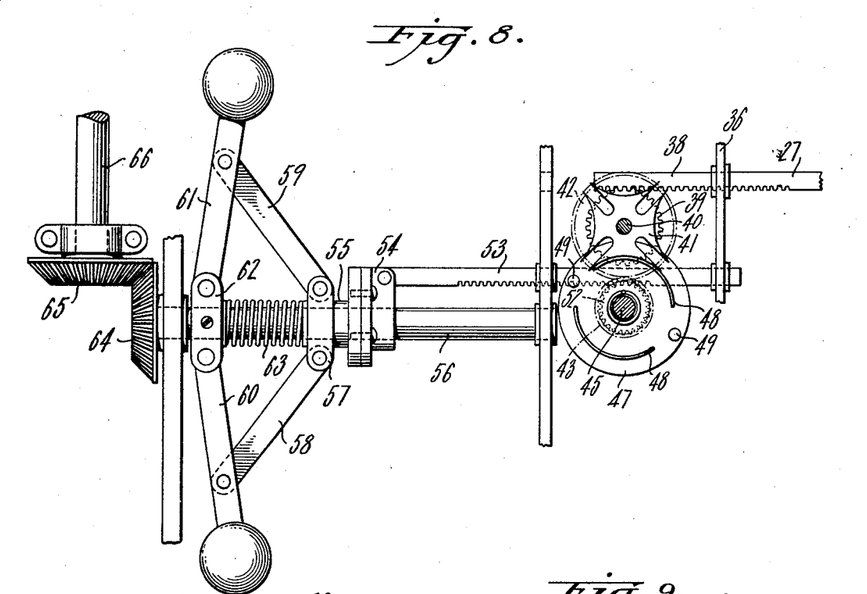
Figure 8 is a part sectional view of speed controlled actuating means for the gear selector on line 8—8 of Figure 9.
Figure 9:
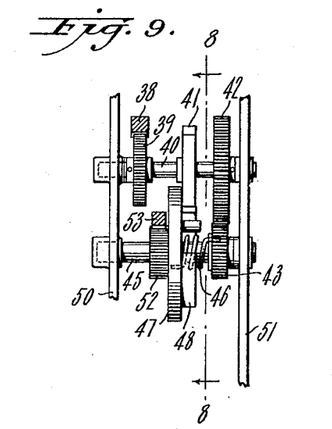
Figure 9 is detail of the Geneva stop motion and connections.
Figure 10:
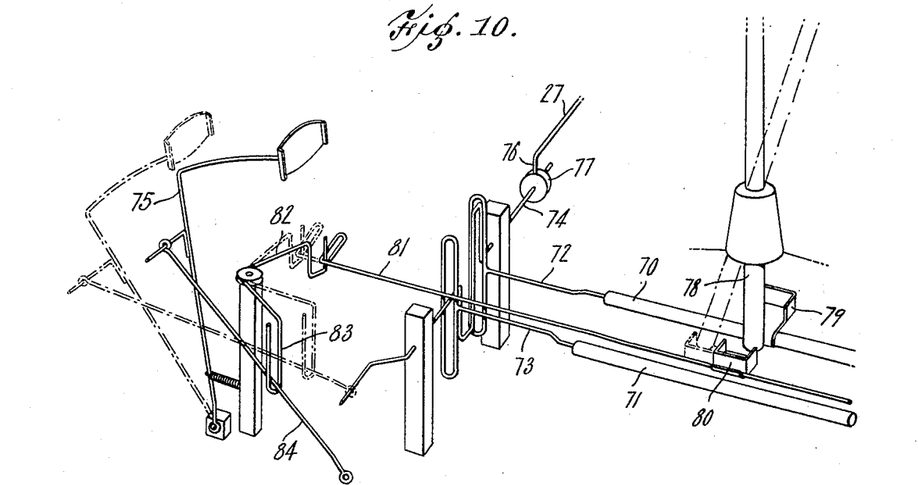
Figure 10 is a diagrammatic perspective of a modified form of my invention.
Figure 11:
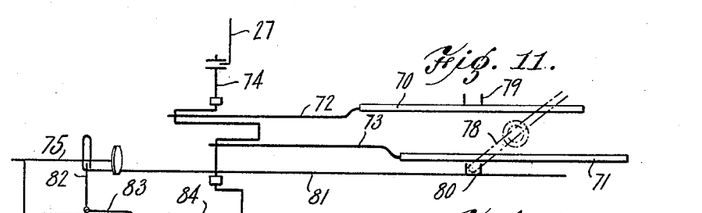
Figure 11 is a diagrammatic plan of a modified form of my invention showing the position of the parts with the vehicle in low gear.

Rod 27, Figures 7, 8 and 9, slidably supported by members 35 (Figure 2) and 36 (Figure 8) attached to the gear housing, terminates in a rack 38 engaging pinion 39 fixed to axle 40 which also carries fixedly mounted the driven member 41 of a Geneva stop motion, and a gear 42. The gear 42 permanently engages a second gear 43 of one-half its size mounted on axle 45 and free to rotate thereon excepting as restricted by spring 46 which is coiled about axle 45 and has one end attached to gear 43 and the other to the driving member 47 of the Geneva motion also mounted on shaft 45 but fixed thereto. The driving member 47 carries on one side the two arcuate surfaces 48 which prevent the rotation of 41 while engaging its concave faces, and member 47 also carries the two pins 49 which at intervals engage the slots of 41 and rotate the latter a quarter turn. Axles 40 and 45 are supported by 50 and 51 attached to the gear housing. Also fixed on shaft 45 is pinion 52 engaging rack 53 which is pinned to split collar 54 and caused to slide along shaft 56 by the lateral motion of flanged sleeve 55. The latter is the free end of a centrifugal governor and carries collar 57 which is linked by 58 and 59 to weighted arms 60 and 61 which in turn are pivotally attached to collar 62. The latter is fixedly attached to shaft 56 and rotates with it. A spring 63 surrounding shaft 56 normally separates sleeves 62 and 55 to the fullest extent. Also fixed to shaft 56 is a bevel pinion 64 engaging bevel pinion 65 mounted on shaft 66 which may be geared in any suitable fashion to the drive shaft of the vehicle.

To put a vehicle equipped with my invention into motion the operator would depress the clutch pedal 5 and move the hand lever 16 from the neutral position to the right and backwards, thus engaging 17, Figure 2, and moving 15 to its forward position and consequently engaging sleeve 10 with sleeve 8 as shown in Figures 3, 5 and 6. Shaft 9 and hence the levers 22, 23 carrying cam rollers 24 and 25 will rotate clockwise as the clutch pedal is released. The vehicle being stationary spring 63 on the centrifugal governor will have caused sleeve 55 to assume a position most distant from sleeve 62 hence through the operation of the Geneva motion rack 38 and rod 27 will have caused sleeve 21 carrying cam levers 22 and 23 to assume its first position as shown in Figure 2 with roller 25 engaging 28. The above rotation of shaft 9 caused by the release of the clutch pedal will thus pull 28 and hence the right gearshift bar 29 into the forward position as shown in Figure 3 which as already stated will engage low gear. As the clutch pedal is then fully released the clutch will engage and the vehicle will move forward in low gear. If for any reason the gears do not mesh, gear shift bar 29 will prevent arm 23 and shaft 9 from rotating further which in turn will prevent clutch pedal 5 from allowing the clutch to engage, thus safeguarding the gears against almost certain injury.

Due to the motion of the car the drive shaft will rotate the centrifugal governor and with increased speed sleeve 55 will pull rack 53 to the left thus rotating the driving member 47 of the Geneva stop motion counterclockwise, Figures 8 and 9. Since one of the arcuate surfaces 48 on the driving member 47 prevents driven member 41 from rotating, shaft 40 and hence gears 42 and 43 will be held stationary while shaft 45 rotates. Spring 46 will thus be put under stress. At some predetermined speed, say two and one-half miles-per-hour, pin 49 enters one of the slots on the driven member 41 of the stop motion. In about this position the arcuate surface 48 no longer prevents the rotation of driven member 41 and pin 49 will commence to rotate the latter, in which action it will be assisted by the energy stored in spring 46 which is now released and acts to rotate gear 43 and hence gear 42 and shaft 40. In other words, even though the rotation of driving member 47 be very gradual, as soon as driven member 41 is free to rotate it will do so immediately and take up its next stop position. This would not be true of an ordinary Geneva stop motion and the difference is caused by addition of spring 46 and its attachments which so far as I know is new.

The quarter turn of shaft 40 will rotate pinion 39 and move rod 27 through rack 38 to the right which will shift cam levers 22—23 from the first position to the second shown in Figure 7, providing the clutch pedal is depressed and the cam levers 22—23 in the neutral position as shown in Figure 1. If not, 22—23 will be held by slotted piece 33 and prevented from sliding along shaft 9. This will of course stop rod 27 from moving and consequently driven member 41 from rotating. This motion will however take place when next the clutch pedal is depressed to the point where lever 23 clears the first lug on 33.

With the cam levers in the second position, Figure 7, cam roller 24 engages hooked member 30 and as the clutch pedal is released and shaft 9 rotates clockwise, 30 and consequently the left gear shift bar 31 will be pushed to the backward position shown in Figure 5 which as explained engages second gear. On the further release of the pedal the clutch engages and the vehicle moves ahead in second gear. As the speed increases sleeve 55 on the governor moves still further to the left, rotating pinion 52 and hence driving member 47 counterclockwise until at some predetermined speed say twelve miles-per-hour pin 49 enters a slot on 41 and the latter tends to rotate. As explained above, this will take place if the clutch pedal is fully depressed, otherwise it will take place when it is next depressed. When this occurs cam levers 22 and 23 will slide along shaft 9 from the second to the third position. In this position cam roller 25 will engage hooked member 32 and as the clutch pedal is released and shaft 9 rotates clockwise 32 and consequently the left gear shift bar 31 will be pulled to the forward position as shown in Figure 6 which as already explained engages high gear. As the clutch pedal is fully released the clutch will engage and the vehicle move ahead in high gear.

With any further increase in car speed no great motion of sleeve 55 will take place since the centrifugal governor has by now assumed about the position shown in Figure 8.

A higher gear is changed to a lower one by exactly similar but opposite motions. As the vehicular speed decreases, sleeve 55 of the centrifugal governor will be moved to the right by spring 63 which will tend to rotate the driving member 47 of the Geneva stop motion clockwise. As before, so long as driven member 41 is not free to rotate, the rotation of driving member 47 will put spring 46 under stress until pin 49 enters one of the slots in 41 at which time the arcuate surface 48 will no longer prevent the rotation of 41. The latter will immediately rotate ¼ revolution counterclockwise with the release of spring 46, pulling rod 27 to the left an equivalent amount and thus moving sleeve 21 carrying cam levers 22 and 23 from the third position to the second position, providing of course the clutch pedal is depressed and the gears in neutral as in Figure 1. It must be noted that this transition from high to second takes place not at the same critical speed (twelve miles-per-hour) as does the transition from second to high, but at some slightly lower speed. This is due to the inhibiting action of spring 46 which always acts against the rotation of the driving member 47 of the Geneva stop motion whether counterclockwise as in the case of increasing vehicle speed or clockwise as in the case of decreasing vehicle speed. The same thing of course will be true of the critical speed between low and second gear, and sleeve 21 will be brought from the second to the first position in an exactly similar manner.

Having brought the vehicle to rest with, of course, the clutch pedal depressed the operator may push hand lever 16 forward to the neutral position, Figure 2, which will disengage sleeve 10 from sleeve 8 thus rendering inoperative the automatic shift. If the clutch pedal is then released the gears will remain in neutral and although the clutch fully engages no motion will be imparted to the vehicle. If the operator wishes to reverse he depresses the clutch pedal and moves the hand lever 16 to the left and forward, thus engaging slotted piece 20 mounted on the right gear shift bar 29 and moving the latter to its backward position which as explained above in discussing the universal gear shift, engages reverse.

Figures 10, 11, 12 and 13 illustrate an alternative mechanism which shows in a diagrammatic manner the principles of my invention. In this mechanism the right and left gear shift bars, respectively 70 and 71, have fixed to their forward ends slotted members 72 and 73 which engage the double crank 74, which is rotated 90° counterclockwise from the neutral position shown in Figure 10 by the clutch mechanism 75 just prior to engagement of the clutch. 74 may be moved laterally only when in the neutral position shown in Figure 10 to assume three lateral positions shown in Figures 11, 12 and 13 corresponding to low, second, and high gear respectively. This lateral motion is governed by the car speed and is accomplished, Figure 10, by pin 76 in rod 27 which engages between flanges 77 rigidly mounted on shaft 74. Rod 27 is moved laterally by the mechanism of Figure 8, the operation of which has already been described.

In the neutral position of the hand lever 78 the automatic shift mechanism is disconnected and the clutch pedal may be released without throwing into mesh any set of gears. It is obvious that reverse may be engaged by moving the lever 78 so as to engage 79 mounted on the right gear shift bar 70 and move the latter backward.

Forward speeds are engaged by first depressing clutch pedal 75 and then moving the hand lever 78 to the right and backward thus engaging 80 and moving the latter forward which through 81, 82 and 83 will connect the clutch pedal 75 through 84 to the double crank 74. If the clutch pedal is now released 74 will be rotated 90° counter clockwise to the position shown in Figure 11 which will move the right gear shift bar 70 to the forward position corresponding to low gear. As the speed of the vehicle increases to some predetermined value, say two and one-half miles-per-hour, the centrifugal governor through the mechanism in Figure 8 will tend to move 74 laterally to the position shown in Figure 12, but cannot do so because of the interference of the double crank with the slotted members 72 and 73, until the clutch is depressed which will rotate 74 to the neutral position shown in Figure 10, thus returning 70 to its neutral position which in turn will disengage low gear.

Figure 12:
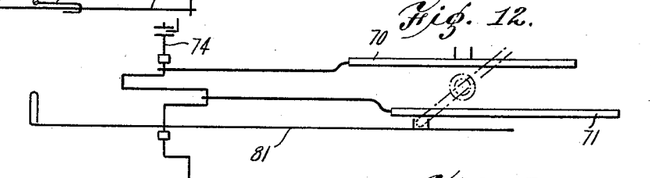
Figure 12 is a view similar to Figure 11 but showing the position of the parts with the vehicle in second gear.
Figure 13:
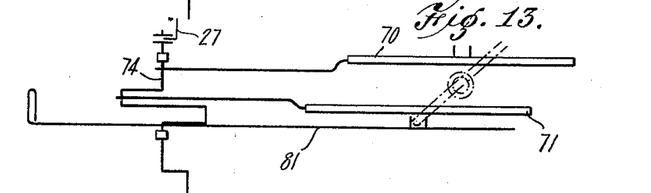
Figure 13 is a view similar to Figure 11 but showing the position of the parts with the vehicle in high gear.

74 will immediately take up the second position corresponding to second gear and if the clutch pedal is released will engage 73 attached to the left gear shift bar 71 and in rotating counterclockwise move the latter to the backward position shown in Figure 12 thus engaging second gear.

Again as the car speed increases and reaches some predetermined value, say twelve miles-per-hour, the centrifugal governor through the mechanism shown in Figure 8 will tend to move 74 laterally to its next position at the extreme left and will do so if the clutch pedal is depressed. This action will simultaneously return 71 to its central position thus disengaging second gear and if the clutch pedal is now released 74 will be rotated counterclockwise and 71 will be moved to its extreme forward position shown in Figure 13, thus engaging high gear.

If the speed of the car diminishes below a critical speed 74 will be moved to the left as before only when the clutch is disengaged and second or low gear will be engaged depending on the car speed at the moment when the clutch pedal is released. Or if it is wished to bring the vehicle to a complete stop 80 is moved backwards by returning the hand lever 78 to neutral. This action disconnects 84 and the clutch pedal may be released without engaging any train of gears.

It will be noted that an advantage inherent in the above described modified mechanism is that the gear shift bar not in use is held in the neutral position. This eliminates the need for the ball- or plunger-and-spring detents (except for reverse) commonly employed to hold the gear shift bars in each of the operating and neutral positions. The elimination of these detents reduces considerably the force required of the automatic mechanism to shift gears.

It is obvious that numerous changes may be made in the details of my invention and I do not desire that it be limited otherwise than as required by the prior art.

Having thus described my invention, what I claim and wish to protect by Letters Patent is:

1. A vehicle gear shifting mechanism comprising changeable gears, gear selecting means governed by vehicle speed, gear shifting means, a clutch, clutch operating means, and means for operatively connecting or disconnecting said clutch operating means to said gear shifting means, said connecting means being a positive one for at least a part of the movement of said clutch operating means.

2. A vehicle gear shifting mechanism comprising changeable gears, gear selecting means governed by vehicle speed, gear shifting means, a clutch, clutch operating means, means for operatively connecting or disconnecting said clutch operating means to said gear shifting means, and means for locking said last means against movement when the clutch is engaged.

3. A vehicle gear shifting mechanism comprising changeable gears, members for shifting from neutral into each forward gear or vice versa, a shiftable gear selector adapted for operative connection with a selected one of said members and for simultaneously locking another of said members against movement, means governed by vehicle speed for shifting said selector, a clutch, clutch operating means, and means operatively connected to said clutch operating means for positively actuating said selector.

4. A vehicle gear shifting mechanism comprising a clutch, clutch operating means, changeable gears actuating members for shifting from neutral into each forward gear or vice versa, a shiftable gear selector, means governed by vehicle speed for shifting said selector into operative connection with one of said actuating members, an actuating connection engageable between said selector and said clutch operating means, means for preventing either engagement or disengagement of said actuating connection while the clutch is engaged, and means for preventing shifting of said selector while the clutch is engaged.

5. A vehicle gear shifting mechanism comprising changeable gears, actuating members for shifting from neutral into each forward gear or vice versa, a slidable and rotatable gear selector, means governed by vehicle speed for sliding said selector into operative connection with one of said actuating members, a clutch, operating means therefor, and a connection between said operating means and said gear selector for positively rotating the latter in either direction when in operative connection with one of said actuating members.

6. A vehicle gear shifting mechanism comprising changeable gears, slidable members for shifting from neutral into each forward gear or vice versa, a shaft, a gear selector splined to said shaft and comprising arms projecting therefrom, means governed by vehicle speed for axially shifting said selector to bring one of said arms into operative connection with a selected one of said slidable members, a clutch, clutch operating means, and means for rotatively connecting said shaft with the clutch operating means.

7. A vehicle gear shifting mechanism comprising changeable gears, slidable members for shifting from neutral into each gear or vice versa, a shaft, a gear selector splined to said shaft and comprising axially offset outwardly projecting arms, means governed by vehicle speed for axially shifting said selector to bring one of said arms into operative connection with a selected one of said slidable members, a clutch, clutch operating means, means for rotatively connecting said shaft with the clutch operating means, and means for locking said connecting means while the clutch is engaged.

8. A vehicle gear shifting mechanism comprising changeable gears, members for shifting from neutral into each forward gear or vice versa, a gear selector shiftable into operative connection with any of said members, means governed by vehicle speed for shifting said gear selector, said last means including an intermittently operative driving connection which is instantaneously operatable at predetermined vehicle speeds, a clutch, clutch operating means, and means actuated thereby for moving a gear shifting member when the latter is operatively connected to the gear selector.

9. A vehicle gear shifting mechanism comprising changeable gears, actuating members for shifting from neutral into each forward gear or vice versa, a shiftable gear selector, means governed by vehicle speed for shifting said selector into operative connection with the proper actuating members, said last means including an intermittent drive mechanism, and means for actuating said selector when so connected.

10. A vehicle gear shifting mechanism comprising gear changing members, a clutch, means for engaging or disengaging said clutch, a shiftable operating connection between said last means and any of said gear changing members, a Geneva stop movement having a driven member connected to said operating connection for shifting it and a driving member governed by vehicle speed, and means supplemental to the driving member for instantaneously actuating the driven member at each release thereof and irrespective of its direction of rotation.

11. A vehicle gear shifting mechanism comprising a centrifugal governor driven in accordance with vehicle speed, a Geneva stop movement having driving and driven members, a connection between said governor and said Geneva driving member for rotating the latter clockwise or anticlockwise, a spring operatively connected to said Geneva driving and driven members and adapted to be placed under stress upon movement of the driving member in either direction and to supplement the action of the driving member when the driven member is released, gear changing members, a shiftable gear selector movable into operative connection with a selected one of said gear changing members, a connection between said gear selector and the driven Geneva member for shifting the selector, and means for actuating said selector when operatively connected to a gear changing member.

12. A vehicle gear shifting mechanism comprising changeable gears, slidable members for shifting from neutral into each forward gear or vice versa, a shiftable gear selector adapted for engagement with a selected one of said slidable members, a Geneva stop movement comprising driven and driving members, a rack operatively connected to the driven member and to said gear selector, a rack operatively connected to the Geneva driving member, centrifugal driving means for said last rack, means connected to the vehicle drive shaft for rotating said centrifugal driving means, a clutch, and means actuated by engagement or disengagement of the clutch for operating a gear shifting member through the gear selector.

13. A vehicle gear shifting mechanism comprising changeable gears, gear selecting and shifting means automatically movable in accordance with vehicle speed into operative connection with a selected gear, a clutch, clutch engaging means, and means for positively connecting said last means with the gear selecting and shifting means during at least a part of the engaging movement of the clutch, whereby, upon failure of the selected gear to engage, the clutch is held out of engagement by said positive connecting means.

14. A vehicle gear shifting mechanism comprising changeable gears, a rotatable gear selector automatically slidable into operative connection with a selected gear, a clutch, clutch operating means for engaging or disengaging said clutch, and a connection between said last means and rotatable gear selector for positively rotating the latter to engage or disengage the selected gear during engaging or disengaging movements of the clutch operating means, whereby, upon failure of the selected gear to engage, the connection prevents the clutch from engaging.

15. A vehicle gear shifting mechanism comprising a clutch, clutch operating means, changeable gears, a gear selector automatically movable in accordance with vehicle speed into operative connection with a selected gear, and means for actuating the gear selector to shift the selected gear, said means comprising a connection between the gear selector and clutch operating means for positively moving the selected gear toward engagement when the clutch is moved toward engagement, whereby, upon failure of the selected gear to engage, the clutch is prevented by said connection from engaging.

16. A vehicle gear shifting mechanism comprising changeable gears, slidable members for shifting from neutral into each forward gear or vice versa, a rotatable gear selector axially shiftable transversely to the direction of motion of said slidable members, means, governed by vehicle speed for shifting said gear selector into operative connection with a selected one of said slidable members, a clutch, clutch operating means, and means for rotatively connecting said gear selector with the clutch operating means.

Signed at New York in the county of New York and State of New York.

RUSSELL HOPKINSON.